United States Patent
Tønnessen

(10) Patent No.: US 10,794,386 B2
(45) Date of Patent: Oct. 6, 2020

(54) SUBSEA COMPRESSOR DIRECTLY DRIVEN BY A PERMANENT MAGNET MOTOR WITH STATOR AND ROTOR SUBMERGED IN LIQUID

(75) Inventor: Leif Arne Tønnessen, Bærums Verk (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 206 days.

(21) Appl. No.: 14/123,075

(22) PCT Filed: May 31, 2012

(86) PCT No.: PCT/EP2012/060206
§ 371 (c)(1),
(2), (4) Date: Nov. 27, 2013

(87) PCT Pub. No.: WO2012/163996
PCT Pub. Date: Dec. 6, 2012

(65) Prior Publication Data
US 2014/0105765 A1    Apr. 17, 2014

(30) Foreign Application Priority Data

May 31, 2011   (NO) .................................. 20110786

(51) Int. Cl.
| | |
|---|---|
| *F04D 25/06* | (2006.01) |
| *F04D 29/08* | (2006.01) |
| *F04D 29/056* | (2006.01) |
| *F04D 29/58* | (2006.01) |
| *F04D 29/063* | (2006.01) |
| *H02K 5/128* | (2006.01) |

(52) U.S. Cl.
CPC ..... *F04D 25/0686* (2013.01); *F04D 25/0606* (2013.01); *F04D 29/056* (2013.01);
(Continued)

(58) Field of Classification Search
CPC ............. F04D 13/0606; F04D 13/0653; F04D 29/057; F04D 29/063; F04D 29/0473;
(Continued)

(56) References Cited

U.S. PATENT DOCUMENTS 3,694,110 A * 9/1972 Guinard ...................... 417/423.3
3,850,550 A * 11/1974 Kaessen ................ F04D 29/586
    415/109

(Continued)

FOREIGN PATENT DOCUMENTS

EP     1 826 887 A2    8/2007
EP      1826887 A2 *   8/2007  ............. F04D 1/063
(Continued)

*Primary Examiner* — Kenneth J Hansen

(57) ABSTRACT

A compressor system includes a compressor unit having a first rotor and a permanent magnet motor unit having a second rotor connected to the first rotor. The first and second rotors are rotatably supported on at least first, second and third bearings, and the compressor system further includes a housing having a first chamber in which the motor unit is located, a second chamber in which the compressor unit is located and a third chamber in which at least the first bearing is located. The first and third chambers are fluidly sealed from the second chamber and contain a cooling, lubricating and barrier liquid within which the motor unit and the first bearing are submerged, and during operation of the compressor system the fluid is circulated between the first and third chambers.

5 Claims, 1 Drawing Sheet

Fig. 1

(52) U.S. Cl.
CPC ......... *F04D 29/063* (2013.01); *F04D 29/083* (2013.01); *F04D 29/584* (2013.01); *F04D 29/5806* (2013.01); *H02K 5/1285* (2013.01)

(58) Field of Classification Search
CPC ............... F04D 29/582; F04D 29/5826; F04D 29/5833; F04D 29/08; H02K 1/27; F04B 39/06
USPC ......... 417/423.1, 423.8, 414, 366, 367, 368, 417/371, 228, 423.12, 423, 13, 423.14; 310/52, 54, 57
See application file for complete search history.

(56) References Cited

U.S. PATENT DOCUMENTS

| | | | |
|---|---|---|---|
| 4,669,961 A * | 6/1987 | Lorett | 418/1 |
| 5,382,141 A * | 1/1995 | Stinessen | 417/423.8 |
| 6,579,078 B2 * | 6/2003 | Hill | F04D 17/122 |
| | | | 417/228 |
| 7,654,328 B2 * | 2/2010 | Stinessen | F04D 25/0606 |
| | | | 166/337 |
| 2009/0266553 A1 * | 10/2009 | Skofteland | F04D 17/122 |
| | | | 166/351 |

FOREIGN PATENT DOCUMENTS

| | | |
|---|---|---|
| EP | 2 103 810 A1 | 9/2009 |
| EP | 2 284 399 A1 | 2/2011 |
| WO | WO 00/73621 A1 | 12/2000 |
| WO | WO 2010/014640 A2 | 2/2010 |
| WO | WO 2010014640 A2 * | 2/2010 ............. H02K 5/132 |
| WO | WO 2011/019334 A1 | 2/2011 |

* cited by examiner

SUBSEA COMPRESSOR DIRECTLY DRIVEN BY A PERMANENT MAGNET MOTOR WITH STATOR AND ROTOR SUBMERGED IN LIQUID

BACKGROUND OF THE INVENTION

The present invention regards a compressor system specifically adapted for submerged use, for instance subsea use.

The current solutions for subsea compression are perceived as costly, complex, large and heavy with extensive use of what could be considered as immature technology in relation to subsea oil and gas exploration and subsea processing.

One of these known solutions is to have a hermetically sealed compressor/motor solution with the rotor supported by active magnetic bearings. These systems are set in a gas atmosphere within a sealed housing, where the motor and penetrators in most cases are cooled by process gas. One problem with these solutions is that they do not tolerate sour service, due to the sensitive electrical windings and connections in a process gas environment. Active magnetic bearings with an advanced control system would also contribute to complexity and cost of the system. One example of a solution with at least some of these features is described in EP1826887.

There is also another known compressor system for subsea use, with two contra rotating electric motors used to generate the relative speed required for gas compression. The motor stator and rotor are submerged in liquid and bearings are of plain liquid lubricated type. However, because the motors are of standard induction type with large diameter rotors and little clearance between stator and rotor, the speed is limited due to the windage losses associated with the viscosity and friction of liquid. In order to obtain the relative speed required for a gas compressor, two contra-rotating motors are used. The contra-rotating principle has some main drawbacks: One is that a balance piston is difficult to incorporate, meaning that thrust bearing is highly loaded. This limits the allowed differential pressure of the system. A second drawback is that the thermodynamic principle can only be based on axially impellers/blades with limited capability to generate differential pressure.

A third drawback is that this known system also has a high complexity and a relative large size.

A third known subsea compression concept is an induction motor driven compressor using step-up gearing to increase the speed of the compressor unit.

In a neighbouring field of technologies one may find submerged pumps arranged with an induction motor unit and plain lubricated bearings, all sealed within a housing filled with a liquid acting as a cooling, lubricating and barrier fluid (to protect for ingress of process fluid). However using a compressor unit in this configuration would not give a desired outcome. An induction motor submerged in a liquid would not be fully compliant with a compressor unit, as the obtainable rotational speed for such motors submerged in a liquid would not be high enough for a compressor unit. There is also from WO2011/019334 known the use of a permanent magnet motor for subsea pump drive.

SUMMARY OF THE INVENTION

The present invention has an aim to provide an alternative compressor system for operation as a submerged compressor system, especially suitable for subsea use.

This aim is achieved with a system as defined in the attached claims.

According to the invention there is provided a compressor system comprising a compressor unit and a motor unit. The motor rotor and compressor rotor in one embodiment may be made out of a common shaft or connected with a coupling but still having a common axis of rotation. Another alternative is to have them connected with a coupling and with different axes of rotation. According to one aspect of the invention the compressor and motor may operate at the same speed, thereby creating no need for an arrangement to increase the compressor speed relative to the motor speed.

The rotor system, the rotor part of the motor unit and rotating parts of the compressor, is according to the invention supported by plain lubricated bearings. The motor and compressor units are installed within a common housing, hermetically sealed against the surroundings, if used subsea sealed against the seawater environment. The motor unit and bearings are submerged in a liquid within the housing, which liquid would act as a cooling, lubricating and barrier liquid. This liquid is hereafter designated as barrier liquid. The barrier liquid is enclosed within the housing, and in one embodiment with mechanical seals as barriers towards the gas compression section of the unit. The barrier liquid may be kept at a pressure equal to or above the pressure of a process fluid possibly with a small defined leakage from motor and bearing compartment into the process. This ensures that contaminants from process can not emerge into the barrier liquid. A hydraulic power unit externally to the compressor unit may control the barrier fluid pressure and replace any barrier liquid leaked to the process. There is according to the invention in relation to the housing and thereby the liquid, provided a cooling arrangement and a circulation arrangement. According to the invention the motor unit is a permanent magnet motor unit.

The permanent magnet motor unit to be used in the invention is characterized by high density magnetic flux. This enables the rotor to be made more compact than an induction motor with similar rating. Rotor windage loss increases with approximately the diameter to the 4th power, thereby a low diameter compact rotor has much less losses and can operate at higher speed until the drop in efficiency gets critical. Additionally, a permanent magnet motor allows for a larger gap between rotor and stator without sacrificing the power factor. This gives an additional reduction in windage losses. Features of such a permanent magnet motor are described in WO2010014640, applicant Direct Drive Systems Inc.

According to an aspect of the invention the barrier liquid circulation arrangement may comprise a circulation impeller attached to the rotor of the motor. This circulation impeller will act on the liquid and set the liquid in motion. The impeller may be attached on an extension of the rotor, with the same rotation axis, or there may be a link, giving the impeller a different rotation axis and/or rotation speed compared with the rotor. The circulation impeller may be positioned tin the housing or possibly in a pipe connected to the housing. There may also be the possibility of forming for instance the housing and elements within the housing such that there will be a natural convective circulation of the liquid due to hot and cold parts of the housing and elements within the housing, this forming the circulation arrangement and cooling arrangement of the invention. Such principles for circulation are known as the heat pipe principle or thermo siphon principle. Another possibility may be to provide a separate circulation unit either within or in association with the housing, forming the circulation arrangement of the Invention. In one possible embodiment the housing may be formed such that it together with the circulation impeller creates a circulation of the liquid within the housing. One possibility of this is to form the housing with a funnel shaped element leading towards the circulation impeller, thereby creating an increased flow of the barrier liquid within the housing. There may in one embodiment also be guide channels towards and away from the circulation impeller. According to the invention there may also be more than one circulation impeller forming the circulation arrangement.

According to another aspect of the invention the cooling arrangement may comprise a cooling unit arranged in a fluid loop extending outside the housing. The barrier liquid within the housing would then be lead through this fluid loop and be cooled by this process. Another possibility is to have the housing at least in one section formed as a cooling unit. i.e. that the cooling arrangement may comprise a cooling unit arranged at or in the wall of the housing. One possibility is to form this cooling unit with fins in the surface either within and or outside to increase the heat transfer through the wall of the housing. Another possibility is to have a fluid loop for the surrounding fluid extending into and through the housing leading outside fluids through the housing, with a circulation unit within this fluid loop and providing a flow of cooling fluid through this fluid loop. Another possibility is to have a combination of some or all these possibilities. According to an aspect of the invention the circulation arrangement and cooling arrangement may be formed in a common arrangement or be separate elements, or a combination of this. Additionally there may be one, two, three or four or more of them.

According to one aspect, the system may comprise pressure means adapted to provide a pressure in the barrier liquid within the housing at a pressure at or above the pressure of a process fluid at the inlet of the compressor unit.

According to an aspect the compressor unit may have one, two, three, four, five, six, seven, eight, nine or more compressor stages or compressor impellers within in the compressor unit. The compressor unit is according to one aspect of the invention based on radial centrifugal compressor principle with shrouded or unshrouded impellers with or without guide vanes, and with open or vaned diffusers. There may also be more than one compressor unit in the housing. The compressor unit may have compressor impellers and they may be arranged in-line or back-to-back. In one embodiment a compressor unit may be positioned in each end of a motor unit. Any combination of the above mentioned features are possible.

According to another aspect there may be arranged a balancing piston on the shaft or rotor of the system. Another possibility may be to have the compressor unit divided in two parts and these two parts arranged as a back to back solution.

According to yet another aspect the rotor element of the compressor unit and the motor unit may be arranged with a direct connection between the motor unit and the compressor unit as a flexible coupling, stiff coupling or common shaft. The compressor unit and the motor unit may have a common shaft.

Figure 1:
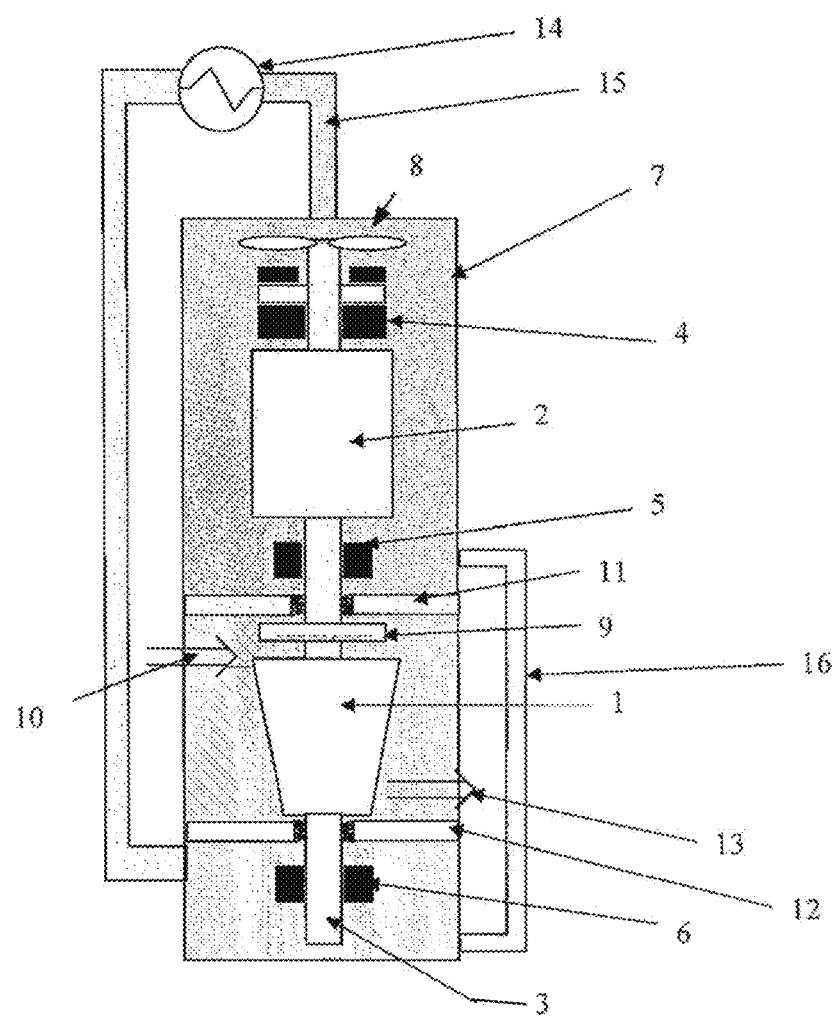
FIG. 1 is a schematic representation of a compressor system in accordance with the present invention.
Figure 2:
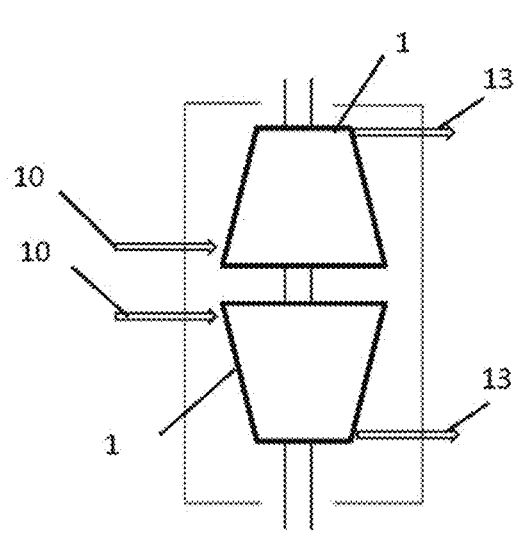
FIG. 2 is a schematic representation of the compressor unit of the compressor system shown in FIG. 1 with the compressor impellers of the compressor unit arranged back-to-hack.
Figure 3:
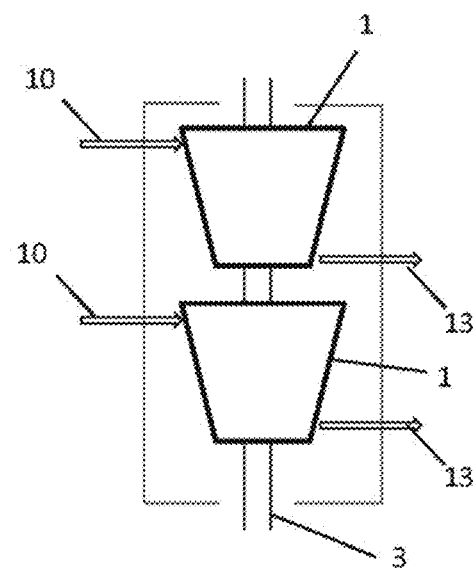
FIG. 3 is a schematic representation of the compressor unit of the compressor system shown in FIG. 1 with the compressor impellers of the compressor unit arranged in-line.

The invention shall now be explained with a non-limiting embodiment and with reference to the attached drawings, in which:

DETAILED DESCRIPTION OF THE INVENTION

The compressor system comprises a compressor unit 1 and a permanent magnet motor unit 2 both arranged with a common rotor axle or shaft 3. The compressor unit 1 has a process fluid inlet 10 and a process fluid outlet 13. The rotor axle or shaft 3 is arranged on plain lubrication bearings, a first bearing 4 on one side of the motor unit 2, a second bearing 5 between the motor unit 2 and the compressor unit 1, and a third bearing 6 on the opposite side of the compressor unit 1, compared with the motor unit 2. The motor unit 2 and first, second and third bearings 4, 5, 6 are all arranged within a housing 7 filled with a liquid. These are also the bearings for the rotor part of the compressor unit. This liquid will act as a lubricator for the bearings 4, 5, 6. In addition, the liquid will act as a barrier fluid, as it is kept at a pressure equal to or above a pressure of the process fluid at the outlet 13 of the compressor unit 1, This will prevent the process fluid from entering the housing and therefore keep any damaging elements within the process fluid away from the elements within the housing. The liquid will also act as a cooling liquid for the motor unit 2 and other elements within the housing, as there is provided a cooling arrangement with liquid loops 15, 16 extending outside the housing to a cooling unit 14 to cool the liquid and to provide for a circulation of the liquid. The housing 7 is divided in three main chamber by two dividers or seal elements 11,12, with the motor unit on one side of the divider 11, the compressor unit 1 between the two dividers 11,12 and the third bearing 6 in the last chamber. The liquid loops are configured such that the first loop 15 connects the chamber with the motor unit 2 with the chamber with the third bearing 6 and TA the second loop 16 connects this chamber with the third bearing 6 with the chamber with the motor unit 2. There is also provided a barrier fluid impeller 8 within the housing 7 to keep the barrier fluid in circulation as long as the compressor system is used. The impeller 8 will also assist in creating a flow through the liquid loops 15,16, thereby cooling the liquid. The barrier fluid impeller 8 is in this embodiment attached directly to the rotor axle or shaft 3. As the compressor unit 1 in this embodiment is one unit, there is provided a balancing piston 9 to balance out axial forces from the compressor unit as it is operated.

The invention has now been explained with reference to non-limiting embodiment. A skilled person will understand that alternations and modifications may be made to the embodiment that are within the scope of the invention as defined in the attached claims. Other number of bearings, such as four or five bearings and/or more dividers or mechanical seals may be possible if rotor dynamic issues require this, as for instance if there is a flexible coupling, a long shaft, long compressor rotor or other issues. The cooling and circulation arrangements may be formed in a different manner than what is schematically sketched on the attached figure. There may for instance be no specific cooling pipes outside the housing as such as these may be positioned in the surface or wall of the housing.

The invention claimed is:

1. A compressor system comprising:
a compressor unit and a motor unit which each comprise a rotor arranged on bearings;
said motor unit and said bearings on which the rotor for the compressor unit and the rotor for the motor unit are arranged being located in a housing and submerged in a cooling, lubricating and barrier liquid enclosed in the housing;
a cooling arrangement to cool the liquid; and
a circulation arrangement to circulate the liquid through the housing;
wherein the motor unit is a permanent magnet motor unit; and
wherein a balancing piston is arranged on the rotor of the compressor unit.

2. A compressor system for compressing a process fluid, the compressor system comprising:
a compressor unit which includes a first rotor;
a permanent magnet motor unit which includes a second rotor that is connected to the first rotor, the first rotor being rotatably supported on at least a first bearing and the second rotor being rotatably supported on at least second and third bearings; and
a housing which comprises a first chamber in which the motor unit is located, a second chamber in which the compressor unit is located and a third chamber in which the first bearing is located, said second chamber being located between said first and third chambers, and said first and third chambers being fluidly sealed from the second chamber and containing a cooling, lubricating and barrier liquid within which the motor unit and the first bearing are submerged, said cooling, lubricating and barrier liquid being different from the process fluid;
wherein the second and third bearings are located in the first chamber and are positioned on opposite sides of the motor unit, said second and third bearings being submerged in the cooling, lubricating and barrier liquid contained in the first chamber; and
means for circulating the cooling, lubricating and barrier liquid between the first and third chambers;
wherein during operation of the compressor system the liquid is circulated between the first and third chambers.

3. The compressor system of claim 2, further comprising:
a cooler which cools the liquid;
wherein during operation of the compressor system the liquid is circulated between the first and third chambers and the cooler.

4. The compressor system of claim 2, wherein the first and second rotors comprise a common axis of rotation.

5. The compressor system of claim 4, wherein the first, second and third chambers are arranged successively within the housing and the first bearing is located at an end of the compressor unit opposite the motor unit, the second bearing is located between the compressor unit and the motor unit, and the third bearing is located at an end of the motor unit opposite the compressor unit.

* * * * *